United States Patent
Galliano et al.

(10) Patent No.: US 11,290,485 B2
(45) Date of Patent: Mar. 29, 2022

(54) METHOD AND SYSTEM FOR DETECTING AND BLOCKING DATA TRANSFER USING DNS PROTOCOL

(71) Applicant: EFFICIENT IP SAS, La Garenne Colombes (FR)

(72) Inventors: Sylvain Galliano, La Garenne Colombes (FR); Jean-Yves Bisiaux, La Garenne Colombes (FR)

(73) Assignee: EFFICIENT IP SAS, La Garenne Colombes (FR)

( * ) Notice: Subject to any disclaimer, the term of this patent is extended or adjusted under 35 U.S.C. 154(b) by 425 days.

(21) Appl. No.: 16/248,337

(22) Filed: Jan. 15, 2019

(65) Prior Publication Data
US 2020/0145454 A1    May 7, 2020

(30) Foreign Application Priority Data
Nov. 6, 2018 (EP) .................................... 18204768

(51) Int. Cl.
*H04L 29/06* (2006.01)
*H04L 61/4511* (2022.01)
*G06N 20/00* (2019.01)

(52) U.S. Cl.
CPC ...... *H04L 63/1466* (2013.01); *H04L 61/1511* (2013.01); *H04L 63/1416* (2013.01); *G06N 20/00* (2019.01)

(58) Field of Classification Search
USPC .......... 726/23, 2, 21, 36; 713/150, 163, 181; 380/255, 264, 276
See application file for complete search history.

(56) References Cited

U.S. PATENT DOCUMENTS

| | | | |
|---|---|---|---|
| 2012/0167210 A1* | 6/2012 | Oro Garcia ........... | H04L 63/101 726/22 |
| 2016/0099852 A1* | 4/2016 | Cook ..................... | H04L 43/08 709/224 |
| 2018/0109494 A1* | 4/2018 | Yu ......................... | H04L 63/029 |
| 2019/0130100 A1* | 5/2019 | Dymshits ............... | G06F 21/64 |
| 2020/0145454 A1* | 5/2020 | Galliano ............ | H04L 61/1511 |

FOREIGN PATENT DOCUMENTS

FR    3053195 A1    12/2017

OTHER PUBLICATIONS

European search report and Written Opinion dated Apr. 16, 2019 in respect of the European Patent Application EP18204768.8.

* cited by examiner

*Primary Examiner* — Sharif E Ullah
(74) *Attorney, Agent, or Firm* — BCF LLP

(57) ABSTRACT

Method(s) and a domain name server (DNS) for detecting and blocking DNS query raised by a computing device are described. In an example implementation, the DNS may implement a method that includes monitoring DNS queries received from a computing device at the DNS. The DNS identifies if a fully qualified domain name (FQDN) associated with the DNS query is not present in a cache of the DNS and DNS responses received by the computing device in response to the DNS queries whose FQDN is not present in the cache. An exfiltration, an infiltration or a tunneling event is detected based on a summation of size of the DNS queries, DNS responses or both. Accordingly, further DNS queries from the computing device may be blocked.

6 Claims, 3 Drawing Sheets

METHOD AND SYSTEM FOR DETECTING AND BLOCKING DATA TRANSFER USING DNS PROTOCOL

CROSS-REFERENCE

The present application claims priority to and is a continuation of European Utility Patent Application No. EP18204768, filed on Nov. 6, 2018, entitled "METHOD AND SYSTEM FOR DETECTING AND BLOCKING DATA TRANSFER USING DNS PROTOCOL," the entirety of which is incorporated herein by reference.

TECHNICAL FIELD

The present invention relates generally to network communication security, and more particularly, but not exclusively to, various embodiments for Domain Name Server (DNS) service defense mechanism.

BACKGROUND

Domain Name System (DNS), in general, refers to a service or a server that translates a domain name, such as a website name or a Uniform Resource Locator (URL) into an Internet Protocol (IP) address and vice-versa. For translating the domain name into the IP address, the DNS may utilize mapping information that generally includes records of most frequently requested domain names with their respective IP addresses. Each domain is managed by a DNS, which is a server that contains the host name information about the hosts and subdomains within the domain.

On some instances, the DNS may not be able to translate the domain name to the corresponding IP address, due to reasons, such as unavailability of the mapping information for the domain name. The DNS server, on such occasions, may request another DNS server, often referred to as a backend server or an authoritative server, to provide the corresponding IP address. The backend server, upon receiving the request, may search for the corresponding domain name within mapping information stored in the cache (or database) of the backend server and provides an answer according to the DNS query type. A host may then be identified based on the IP address for retrieving content associated with the domain name and providing the content to a DNS client computing device.

BRIEF DESCRIPTION OF DRAWINGS

The following detailed description references the drawings, wherein.

Figure 1:
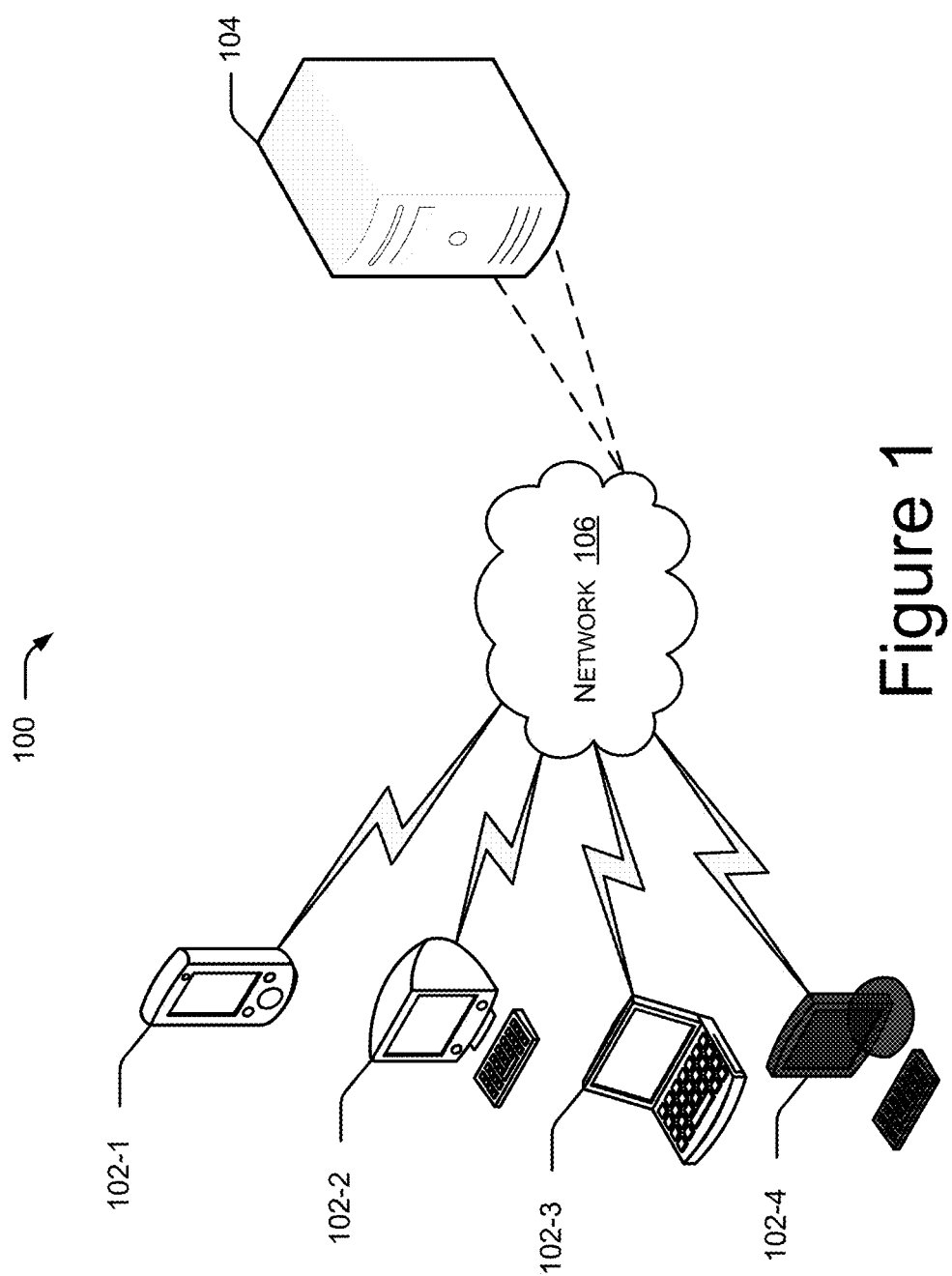
FIG. 1 illustrates a network environment, implementing a DNS request, according to an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

The present subject matter relates to aspects relating to managing Domain Name System (DNS) queries.

The DNS may be prone to cyberattacks and an attacker may take advantage of vulnerabilities of conventional security mechanisms to devise an attack on DNS that the conventional security mechanisms may not be equipped to counter. Various techniques have been used by the attackers to devise the attack, the techniques include method of exfiltration, wherein, unauthorized transfer of data takes place. Normally, when a DNS client sends a query for the IP address on the DNS, the DNS server firstly searches for the domain name in a cache memory of its own, in case of the unavailability of the domain name in the cache memory, the DNS server recursively interrogates the authoritative DNS server for this domain over a network.

For exfiltration, or extracting data, such as social security numbers and credit card information, etc., the attacker makes packets of data that is to be exfiltrated from a suspicious DNS client, encodes the packets, concatenates the packets with a registered domain name and sends them into one or more DNS requests. The generated queries name including the data are forwarded toward a complice authoritative DNS (backend) server that will receive the exfiltrated data.

The attacker may also use the technique of infiltration, wherein, the attacker bypasses normal security and authentication mechanisms, and thereby upload data to a remote unauthorized computer. To infiltrate data, an attacker makes small packets of data and encodes them on a suspicious DNS server under the attacker's control. From the target computing device which is networked with DNS server, the attacker requests a domain name registered on suspicious DNS under the attacker's control. The suspicious DNS responds by returning the encoded packets of data to infiltrate the DNS. The suspicious DNS client decodes the small packet of data received from the DNS and on reassembling the packets, forms the original data containing the sensitive information which results in data breaching.

The other known technique of cyber attack is DNS tunneling, wherein, the techniques of exfiltration and infiltration is used to form a tunnel or two-way communication channel between the complice DNS client and the suspicious DNS server under the attacker's control. Using the DNS tunneling technique, the attacker may exfiltrate sensitive data within the network via DNS requests, as described above. In addition, the suspicious DNS server may respond to the DNS requests with one or more DNS responses that may set up a two-way communication between the DNS client and the suspicious DNS server.

The present subject matter provides a technique for detecting and blocking cyber attacks on DNS services. The example described herein enables an attack blocking module to block the attack on the DNS services, wherein, the attacks on DNS services devised via techniques as described above. The attack blocking may be achieved based on an efficient detection and blocking system for data transfer via the DNS service.

In an implementation of the present subject matter, in case of unavailability of the requested information in cache of a DNS server, the DNS server recursor module queries an authoritative DNS server on the network to fetches the response recursively.

A DNS system of the present subject matter keeps the record of all DNS queries exchanged between an authoritative DNS server and the DNS server to which DNS clients are networked, at least once in the DNS cache. Along with caching the exchanged information, the DNS system also monitors the behavior of DNS clients networked with the DNS server, on the basis of indicators, such as number of data packets sent or received by the DNS client networked with the DNS server. In cases where the response for the request was not available in the DNS cache, another indicator is the summation of requests size, raised by the computing device which is networked with the DNS, where it includes those requests for which response was not available in the DNS cache. A third indicator for monitoring is the summation of responses received by the computing devices against the raised requests interrogated to authoritative DNS server in case response was not available in the cache of DNS server.

During the implementation of the present subject matter, the attack is detected by analyzing the changes in the parameters of the indicators outlined above and upon detection of any cyber attack, the DNS system blocks the data transfer without blocking the rest of the traffic.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a network environment 100 according to an implementation of the present subject matter. The network environment 100 may either be a public distributed environment or may be a private closed network environment. The network environment 100 may include different computing devices 102-1, 102-2, . . . , 102-N, communicatively coupled to a Domain Name System (DNS) server 104 through a network 106. For the sake of explanation, the DNS clients 102-1, 102-2, . . . , 102-N, have been commonly referred to as computing devices 102, and have been individually referred to as DNS client or computing device 102, hereinafter. The network 106 may allow computing devices 102 connected with network 106 through DNS server 104 to communicate with a backend server or hereinafter authoritative DNS server on the network 106 for requesting information which is not with the DNS server 104. In an implementation of the present subject matter, the DNS client 102 may be one of a desktop, a mobile device and a laptop through which a user may request a website using a Uniform Resource Locator (URL). In an implementation, the DNS server 104 may be a name server for parsing domain name queries and identifying a Top Level Domain (TLD) and any other domains from the domain name query and translating the domain name request into a corresponding Internet Protocol (IP) address. The DNS server 104 may also be one of a web server that provides access to the digital content to the computing devices 102, recursive DNS, forwarding DNS and a caching DNS.

The network 106 may be a wireless or a wired network, or a combination thereof. The network 106 can be a collection of computers, servers, mainframes, network devices, peripherals, or other devices, interconnected with each other within the network 106 and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the technology, the network 106 includes various network entities, such as transceivers, gateways, and routers; however, such details have been omitted for ease of understanding.

The network environment 100 comprises the DNS server 104 that may receive requests related to web content from the computing devices 102 and may provide response in form of address of web servers that host the web content. The requests may be generated when a user may intend to access a website through the DNS client 102 and enter a website name or a Uniform Resource Locator (URL) in address bar of a web explorer. The DNS server 104 may fetch the IP address of the DNS client 102 from the received request and then utilize the IP address for transmitting the response to the computing device 102. The DNS server 104 may also store the IP address of the DNS client 102 for responding to subsequent requests from the DNS client 102 with reduced roundtrip time.

Upon receiving the request related to web content from the DNS client 102, the DNS server 104 searches for the response within the cache (shown in FIG. 2) of the DNS server 104. In said scenario, if the response is available, then the DNS server 104 may generate a corresponding response for the request and transmit the response to the DNS client 102.

However, if the cache of the DNS server 104 does not confirm the availability of the response, then the request is forwarded through DNS server 104 to the backend server of the network 106. The DNS server 104 queries the backend server for getting the response against the raised request. Upon receiving the response from the backend server, the DNS client 102 may then be provided with respective response received from the DNS server 104. Therefore, the present subject matter ensures service continuity to the DNS client 102 even when the DNS client 102 looks for the information not available within DNS server 104 cache. The explanation regarding functioning of the DNS server 104 and backend server on the network 106 have been further explained in detail with respect to the description of forthcoming figures.

Figure 2:
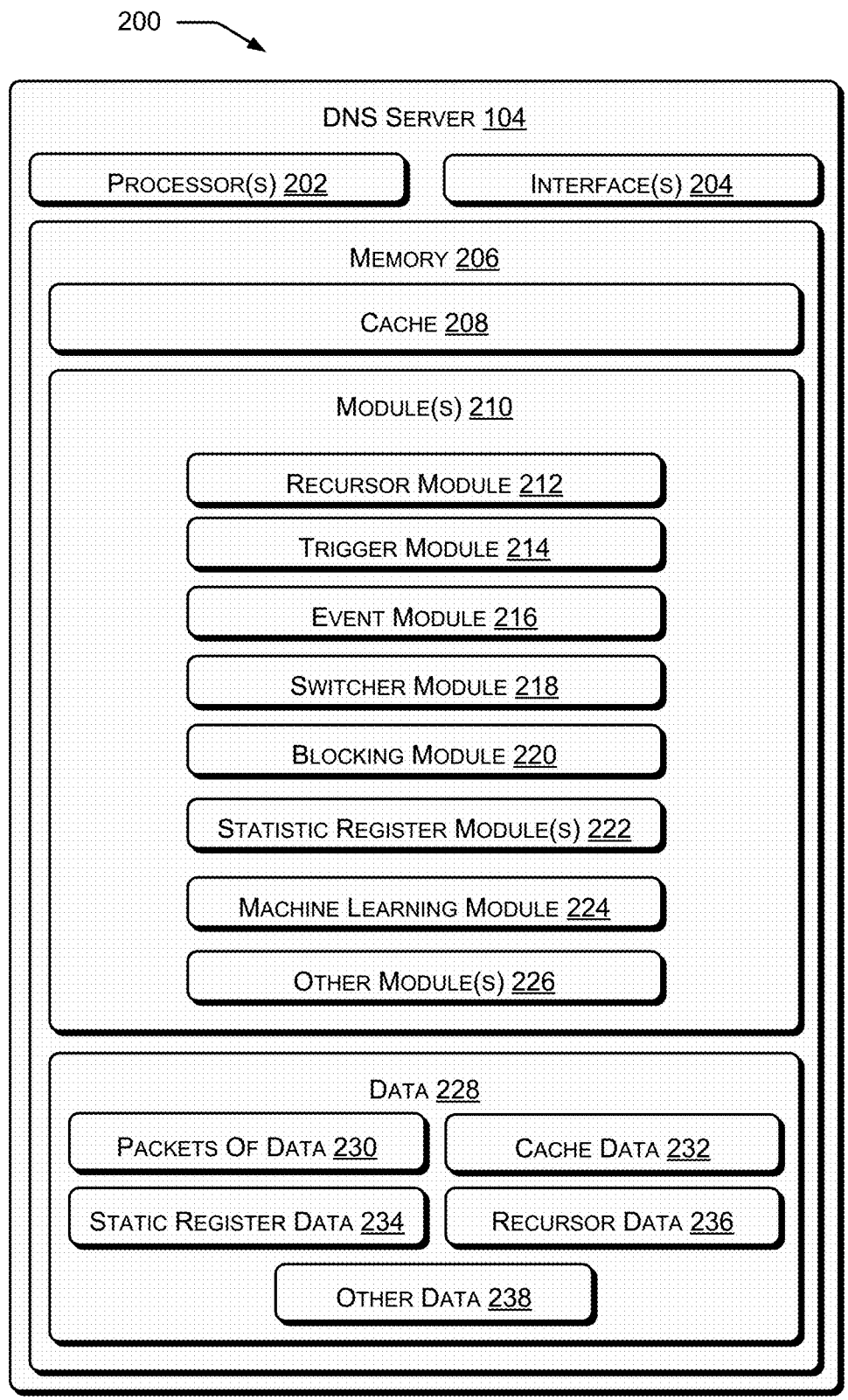
FIG. 2 illustrates schematic representation of components of the DNS server, in accordance with an implementation of the present subject matter.

FIG. 2 illustrates components of the DNS server 104, in accordance with an implementation of the present subject matter. The DNS server 104 may be associated with a cache 208. The DNS server 104 may include a processor(s) 202, an interface(s) 204, and a memory 206. Further, the memory 206 may include module(s) 210 and data 228.

The processor 202, amongst other capabilities, may be configured to fetch and execute computer-readable instructions stored in the memory 206. The processor 202 may be implemented as one or more microprocessors, microcomputers, microcontrollers, digital signal processors, central processing units, state machines, logic circuitries, and/or any devices that manipulate signals based on operational instructions. The functions of the various elements shown in the figure, including any functional blocks labelled as "processor(s)", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), non-volatile storage. Other hardware, conventional and/or custom, may also be included.

The interface(s) 204 may include a variety of machine readable instructions-based interfaces and hardware interfaces that allow the DNS server 104 to interact with different entities, such as the computing devices 102. Further, the interface(s) 204 may enable the components of the DNS server 104 to communicate with the network 106 and external repositories. The interface(s) 204 may facilitate multiple communications within a wide variety of networks and protocol types, including wireless networks, wireless Local Area Network (WLAN), RAN, satellite-based network, etc.

The memory 210 may be coupled to the processor 202 and may, among other capabilities, provide data and instructions for generating different requests. The memory 206 can include any computer-readable medium known in the art including, for example, Volatile memory, suchas static random access memory (SRAM) and dynamic random-access memory (DRAM), and/or non-volatile memory, such as read only memory (ROM), erasable programmable ROM, flash memories, hard disks, optical disks, and magnetic tapes. In an example implementation, the memory 210 may include a cache memory 208.

Among other capabilities, the cache 208 may serve as a repository for storing information about frequently requested domain names and host IP addresses. In an implementation of the present subject matter, the cache 208 may store mapping information for domain names and their respective IP addresses. Although depicted to be internal to the DNS server 104 in the example implementation shown in FIG. 2, in an example, the cache 208 may be an external repository for storing the information about frequently requested domain names. The module(s) 210 residing in the memory 206 may include routines, programs, objects, components, data structures, and the like, which perform particular tasks or implement particular abstract data types. The module(s) 210 may further include modules that supplement applications on the DNS server 104. Further, the module 210 may be implemented in hardware, instructions executed by a processing unit, or by a combination thereof.

In another aspect of the present subject matter, the module(s) 210 may be machine-readable instructions (software) which, when executed by a processor/processing unit, perform any of the described functionalities. The machine-readable instructions may be stored on an electronic memory device, hard disk, optical disk or other machine-readable storage medium or non-transitory medium. In one implementation, the machine-readable instructions may be downloaded also to the storage medium via a network connection.

The data 228 residing within the memory 206 serves, amongst other things, as a repository for storing data that may be fetched, processed, received, or generated by one or more of the module(s) 210.

The module(s) 210 may perform different functionalities which may include, but may not be limited to, fetching response for the DNS clients 102 recursively from the backend server on the network 106, keeping all the information cached at least once in the DNS cache 208, monitoring the behavior of the DNS clients 102 by following predefined set of rules, detecting cyber attack on the DNS server 104, and blocking one or more attacks on the DNS server 104. Accordingly, the module(s) 210 may include a recursor module 212, trigger module 214, an event module 216, a switcher module 218, a blocking module 220, a statistic registers module(s) 222, and a machine learning module 224. Further, the module(s) 210 may include other module(s) 226 for some additional operations, such as, but may not be limited to, selection of parameters of the pre-defined set of rules and determining one or more rules to be implemented during monitoring, detection, and blocking operations. The data 228 may include packets of data 230, cache data 232, static register data 234, recursor data 236, and other data 222.

The recursor module 212 may serve as a middleman between the DNS server 104 and the backend server of the network 106 to recurse up the DNS request to reach the backend server and for storing received information from the backend server to the initial request in the cache 208. The trigger module 214 enables the DNS server 104 to take actions in response to triggers that may occurs depending upon the attack detection rules/instructions defined in the trigger module 214. The event module 216 may receive the information for an event to occur when a condition, for detection of an attack as defined in the trigger module, is met and applied to the DNS. In case the trigger module 214 detects the attack, the information is sent to the event module 216 to send the information to a third-party system about the cyber attack. In an example, the third-party system may be a device accessible by an administrator of the network.

Accordingly, the switcher module 218 may serve to stop the free access to the recursor module 212 by the DNS clients 102 to extract the response of the request which is unavailable with the DNS server 104, from the backend server. Upon detection of the cyber attack, the blocking module 220 may block the DNS requests from the DNS clients 102 and may alert the third-party system to initiate measures to stop the cyber attack. In an example implementation of the present subject matter, the blocking module 220 may also block any new requests for which the DNS server 104 does not have any response in the cache 208. The statistic registers module(s) 222 may constitute set of counters where each counter performs different set of counting operations. The components of static registers module(s) 222 count the number of occurrences of the DNS queries and its format, a DNS response and its format along with other operations that have been further explained in detail with respect to the description of forthcoming figures. In another example implementation of the present subject matter, the machine learning module 224 may monitor the statistics registers module(s) 222 to keep a record of change in the traffic at the DNS server 104. The traffic data collected by the machine learning module 224 may serve to adapt parameters of the trigger module 214 in case of cyber attack.

Figure 3:
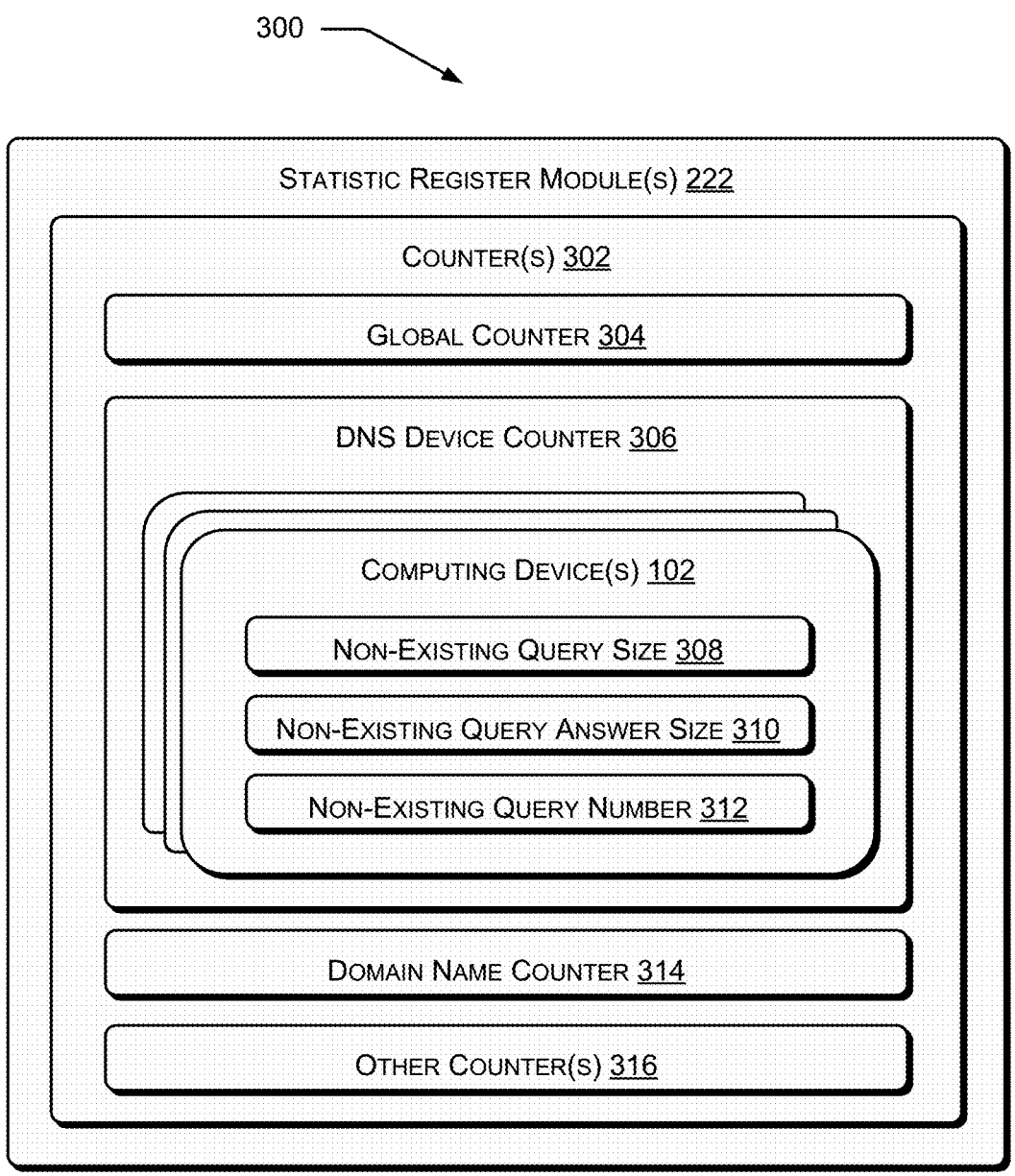
FIG. 3 illustrated schematic representation of components of the static register module, in accordance with an implementation of the present subject matter.

FIG. 3 illustrates components of the statistics register module(s) 222, in accordance with an implementation of the present subject matter. The statistics register module(s) 222 may include a counter 302.

Among other capabilities, the static registers module may constitute the database of the counter(s) 302 for specific operation at DNS. In the counter 302 resides the database of the global counter 304, the DNS device counter 306 specific to each DNS client 102 networked with DNS server 104, and the domain name counter 314 specific to each requested domain name.

Further, the counter(s) 302 may include other counter(s) 316 for some additional operations, such as, but may not be limited to, counting the number of events which occurs during the implementation of monitoring, detection, and blocking operations. The DNS device counter 306 may include different DNS client(s) 102, networked with the DNS server 104, and the DNS client(s) 102 may further include a non-existing query size 308, a non-existing query answer size 310, and a non-existing query number size 312.

In an implementation of the present subject matter, when request is generated by the user of the DNS client 102, the DNS server 104 receives the request. The cache 208 responds directly to the DNS client 102 if it has the valid response requested by the user of DNS client 102. If it does not have the response, the request is forwarded to the recursor module 212 which will fetch the response for the DNS client device 102 recursively from the backend server on the network 106. In return, whatever its value, the DNS response is systematically added to its initial request in the cache 208.

In a scenario, the content of the statistics registers module 222 is updated by the cache 208, the trigger module 214 and the recursor module 212 out of which the cache 208 itself gets updated whenever any new information, which was not in the cache 208 previously, is exchanged between the DNS server 104 and the backend server. Further, the statistics registers module(s) 222, through its components counts (increments or sums) multiple DNS characteristics and states when a DNS query is requested and the format in which it is requested, a DNS response and the format in which response is communicated to the DNS server 104, an action taken on the query, a change in time, the resolution transaction duration, a malformed DNS query, any behaviour of the user of DNS client 102, a state or any system behaviours of the cache 208 or any changes in the recursive action of the recursor module 212.

The counter 302 of the statistic registers module 222 may contain variables, which include but may not be limited to, the non-existing query size 308, the non-existing query answer size 310 and the non-existing query number size 312. In an example, the non-existing query size 308 is the sum of requests which are not stored in the frequently requested domain names of the DNS server 104 in the cache 208 for each of the DNS clients 102. Similarly, the variable, non-existing query answer size 310 is the sum of size of new responses received on the DNS client by requesting an unknown backend server on the network 106 through the DNS server 104 in case of unavailability of the response in the cache 208 of the DNS server 104 for each of the DNS clients 102. Accordingly, the third variable, i.e., the non-existing query number size 312 is the sum of unavailable responses to already requested domain names which are not stored in the frequently responded domain names in the cache 208 of the DNS server 104 for each of the DNS clients 102.

In operation, the triggers module 214 may make it possible to take multiple decisions in accordance to the conditions applied to statistic registers module 220. These decisions drive the events module 216 and the switcher module 218. The conditions of the triggers module 214 is applied to all the components of the DNS server 104 or specifically to a DNS client networked with the DNS server 104. The events module 216 is used for updating a generic register or to send an information message to a third-party system. In an implementation of the present subject matter, following the direction of the trigger module 214, the switchers module 218 makes it possible to block the recursor module 212 uninterrupted access, for a specific DNS client 201 networked with DNS server 104 or it may also block few of the domain names to which the DNS client 102 is communicating. In another scenario, the machine learning module 224 integrated communicatively with the DNS server 104, monitors the statistic registers module 222 to estimate the metrics of the traffic flow when the DNS server 104 is in use. These metrics may be used as variables in the case of triggering.

In an implementation of the present subject matter, when the DNS client 102 executes the exfiltration, it successively sends requests for the specific DNS client 102 whose fully qualified domain name (FQDN) is not present in the cache 208. The size of the domain name for each of these queries is added in the non-existing query size 308 variable coupled to the DNS device counter 306 for this DNS client 102 of the statistic registers module 222. In an example implementation of the present subject matter, when the DNS client 102 performs the infiltration, it successively receives, the responses to its requests whose full domain name is not present in the cache 208. The size of the response of each of these received requests is added in the non-existing query answer size 310 variable coupled to the DNS device counter 306 for the DNS client 102 of the statistic registers module 222. In another example implementation of the present subject matter, when a DNS client 102 executes the tunneling, both the non-existing query size 308 and the non-existing query answer size 310 are incremented simultaneously.

For the security of packets of data 230 during the transfer of data via the DNS server 104 it is to be made invisible on the network environment. The triggering in the DNS server 104 traffic is detected by trigger module 214 by threshold limits of non-existing query size 308 and the non-existing query answer size 310. In an example implementation of the present subject matter, triggering evaluation is applied to variable time windows to detect slow data transfers and massive data transfers. The number of missing queries in the non-existing query size 308 in cache 208 is also considered in the case of slow data transfer detection. In another example implementation of the present subject matter, the machine learning module 224 may dynamically adjust triggering thresholds to optimize data transfer on DNS server 104 and the performance detection to avoid false positive detection. As long as the exfiltration, infiltration, or the tunneling is detected by the trigger module 214, the switcher module 218 and event module 216 may be triggered by the trigger module 214. The switcher module 218 may block the sending of the request to the recursor module 212 for the DNS client 102. The DNS client 102 may continue to receive the responses from the cache 208. At the same time, the event module 216, in an event of detection of any attack, may apply the functionalities of the blocking module 220 via a third-party system to block the cyber attack.

Therefore, the described techniques provide better monitoring, detection, and blocking of the cyber attack on the DNS service and ensures service continuity and security to the DNS clients connected to the network via DNS.

Although implementations of present subject matter have been described in language specific to structural features and/or methods, it is to be understood that the present subject matter is not necessarily limited to the specific features or methods described. Rather, the specific features and methods are disclosed and explained in the context of a few example implementations for DNS.

We claim:

1. A method comprising:
monitoring, by a domain name server (DNS), DNS queries raised by a DNS client communicatively coupled to the DNS;
identifying, by the DNS, from amongst the DNS queries raised by the DNS client, a plurality of DNS queries whose fully qualified domain name (FQDN) is not present in a cache of the DNS;
determining a sum of sizes of the plurality of DNS queries whose FQDN is not present in the cache of the DNS;
detecting, for the DNS client, an exfiltration event based on the sum of sizes of the plurality of DNS queries whose FQDN is not present in the cache of the DNS;
blocking, based on the detection of the exfiltration event, a further DNS query from the DNS client;
providing, by the DNS, an alert to a third-party computing device, wherein the third-party computing device is accessible by an administrator of the DNS or the DNS client;
inspecting, by the DNS, a FQDN associated with the further DNS query from the DNS client; and
allowing the further DNS query if the FQDN is present in the cache of the DNS.

2. The method as claimed in claim 1, wherein the plurality of DNS queries include a same Top Level Domain (TLD) and a different Second Level Domain (SLD).

3. The method as claimed in claim 1, further comprising:
monitoring, by the DNS, DNS responses received by the DNS client, wherein the DNS responses are received in response to the plurality of DNS queries whose FQDN is not present in the cache of the DNS;
detecting, an infiltration event based on a sum of sizes of the DNS responses; and
blocking, based on the detection of the infiltration event, the further DNS query from the DNS client.

4. A non-transitory computer-readable medium comprising instructions executable by a processing resource to:
monitor a plurality of DNS queries generated by a DNS client communicatively coupled to a DNS, wherein the plurality of DNS queries are associated with a fully qualified domain name (FQDN) not present in a cache of the DNS;
identify, a plurality of DNS responses received by the DNS, wherein the plurality of DNS responses are received in response to the plurality of DNS queries whose FQDN is not present in the cache of the DNS;
determine, at least one of a sum of sizes of the plurality of DNS queries and a sum of sizes of the plurality of DNS responses;
block, based on the sum of sizes of the plurality of DNS queries or the sum of sizes of the plurality of DNS responses, a further DNS query from the DNS client;
provide an alert to a third-party computing device, wherein the third-party computing device is accessible by an administrator of the DNS or the DNS client;
inspect a FQDN associated with the further DNS query from the DNS client; and
allow the further DNS query if the FQDN is present in the cache of the DNS.

5. The non-transitory computer-readable medium as claimed in claim 4, further comprising instructions executable by a processing resource to identify a Top Level Domain (TLD) and a Second Level Domain (SLD) associated with each of the plurality of DNS queries.

6. A domain name server (DNS) for executing DNS queries initiating from a DNS client, the DNS comprising:
a processor;
and
memory comprising a cache and executable instructions, wherein the executable instructions, when executed by the processor, cause the DNS to:
monitor a plurality of DNS queries generated by the DNS client, wherein the plurality of DNS queries are associated with a fully qualified domain name (FQDN) not present in the cache;
identify, a plurality of DNS responses received by the DNS, wherein the plurality of DNS responses are received in response to the plurality of DNS queries whose FQDN is not present in the cache of the DNS;
determine, at least one of a sum of sizes of the plurality of DNS queries and a sum of sizes of the plurality of DNS responses;
block, based on the sum of sizes of the plurality of DNS queries or the sum of sizes of the plurality of DNS responses, a further DNS query from the DNS client;
provide an alert to a third-party computing device, wherein the third-party computing device is accessible by an administrator of the DNS or the DNS client;
inspect a FQDN associated with the further DNS query from the DNS client; and
allow the further DNS query if the FQDN is present in the cache.

* * * * *